United States Patent [19]
Bonko et al.

[11] Patent Number: 5,337,816
[45] Date of Patent: Aug. 16, 1994

[54] PNEUMATIC AGRICULTURAL TIRE

[75] Inventors: Mark L. Bonko, Uniontown; Loran C. Lopp, Jr., Wadsworth, both of Ohio

[73] Assignee: The Goodyear Tire & Rubber Company, Akron, Ohio

[21] Appl. No.: 984,194

[22] Filed: Nov. 20, 1992

[51] Int. Cl.$^5$ ............................................. B60C 11/03
[52] U.S. Cl. ............................ 152/209 R; 152/209 B
[58] Field of Search ... 152/209 R, 209 B, D144–D151

[56] References Cited

U.S. PATENT DOCUMENTS

| | | | |
|---|---|---|---|
| 4,186,788 | 2/1980 | Pommier | 152/209 B |
| 4,289,183 | 9/1981 | Abe et al. | 152/209 A |
| 4,446,902 | 5/1984 | Madec et al. | 152/209 B |
| 4,534,392 | 8/1985 | Bonko et al. | 152/209 B |
| 5,002,110 | 3/1991 | Tsurunaga et al. | 152/209 R |
| 5,010,935 | 4/1991 | Bonko et al. | 152/209 B |

FOREIGN PATENT DOCUMENTS

| | | |
|---|---|---|
| 0086172 | 8/1983 | European Pat. Off. . |
| 0442427 | 8/1991 | European Pat. Off. . |
| 0495619 | 7/1992 | European Pat. Off. . |

OTHER PUBLICATIONS

"1991 Tire Tread Design, " Sigma Rear Wheel Multi--Trac L/S Rear Radial (R1) p. 217.
*1991 Tread Design Guide*, Firestone Implement Irrigation Special (R-1), p. 210.
*1991 Tread Design Guide*, Kelly-Springfield Rear Wheel Irrigation Traction (R-1), p. 213.
*1991 Tread Design Guide*, Sigma Rear Wheel Multi--Trac L/S Rear Tractor (R-1), p. 217.

*Primary Examiner*—Michael W. Ball
*Assistant Examiner*—Nancy T. Krawczyk
*Attorney, Agent, or Firm*—David L. King

[57] ABSTRACT

An improved pneumatic agricultural tire (10) having a maximum section width (SW), an equatorial plane (EP) and a rim diameter (D) of 24 (61 cm) inches or greater is described. The tire (10) is particularly well suited for use as an irrigation tire. The tire (10) comprises a casing (12) having a cord reinforced rubber coated carcass (14) and a rubber tread (40) disposed radially outwardly of the carcass. The tread (40) includes an inner tread (42) and tread lugs (44,44L). The lugs (44,44L) are of a depth of less than R1, (R1 being defined as about 1.52 inches or about 3.9 cm) preferably about 80% of the R1 depth. The lugs extend axially inward a distance of 25% to 60% of the section width from an axially outer end to an axially inner end and less than a majority of the lugs extend across the equatorial plane of the tire. The tread (40) has a net-to-gross ratio of less than 30%. The tread lugs each have a centerline located midway between leading (52) and trailing edges (54) of the lug (44,44L). The circumferential spacing $\chi_n$ of the adjacent lugs (44,44L) is at a circumferential plane (CP) parallel to and located 75% of the distance SW/2 from the equatorial plane (EP) to a plane tangent to the casing (12) at the maximum section width. The distance $\chi_n$ varies by at least 10% of the section width from each circumferentially adjacent lug spacing, preferably at least 15%.

14 Claims, 14 Drawing Sheets

PNEUMATIC AGRICULTURAL TIRE

BACKGROUND OF THE INVENTION

This invention relates to an agricultural pneumatic tire. More particularly, this invention relates to a class of agricultural tires known as irrigation tires.

Irrigation tires are used in specially designed irrigation apparatus. The tires support the sections of piping. Each section spans from 80 feet to 124 feet and enough sections can be attached together to span one-quarter mile. The apparatus pivots about a well head or water supply and can traverse 360° yielding a circular irrigated field having a diameter of one-half mile. Each such system uses twenty tires, two tires at each support truss.

The tires employed in such a system simply must be able to support the plumbing or irrigation pipe's weight and provide sufficient traction to move the irrigation apparatus at very slow speeds sometimes measured in minutes per revolution.

The tires are designed for maximum cost efficiency. The carcass of an irrigation tire is generally constructed of only two bias plies wrapped around a pair of beads; no reinforcing belts are used. The tires have a nominal rim diameter of 24.00 inches (61 cm) or greater and an overall diameter of about 43 to 58 inches (109 cm to 147 cm), depending on rim size. The tread has an inner tread and tread lugs having a depth less than the regular R1 depth as defined in the 1992 *Tire and Rim Association, Inc. Yearbook*, and as used in shallow nonskid tires. That is in tires having a nonskid level of less than 100. The nonskid, being the height of the lug element to the inner tread surface as measured by any of the common means known in the art. The level 100 means the recommended height of the lugs as set forth in the Engineering Design Information standard of the U.S. Tire & Rim Associations. Any greater or lesser depth would be indicated as a percentage of this standard. For example, a height which would be 90% of this level would be a 90 non skid.

The prior art irrigation tires were historically produced from obsolete rear farm tire molds. Due to the increased demand for irrigation in dry regions of the world, the number of irrigation tires sold has increased, warranting a design specifically suited to this use.

DEFINITIONS

The following definitions are applicable to this specification, including the claims, wherein:

"Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Bias ply" means a tire having bias angled carcass, the angle of the cords being about 25 to 500 relative to the equatorial plane of the tire. Each adjacent ply has cords equal but oppositely oriented.

"Carcass" means the tire structure apart from the belt structure, tread, undertread, and sidewall rubber over the plies, but including the beads;

"Casing" means the tire structure apart from the tread and undertread, but including the sidewalls;

"Circumferential" means lines or directions extending along the perimeter of the surface of the annular tread perpendicular to the axial direction;

"Design rim" means a rim having a specified configuration and width;

"Design rim width" is the specific commercially available rim width assigned to each tire size and typically is between 75 and 90% of the specific tire's section width;

"Equatorial plane (EP)" means the plane perpendicular to the tire's axis of rotation and passing through the center of its tread;

"Footprint" means the contact patch or area of contact of the tire tread with a flat surface at zero speed and under normal load and pressure;

"Inner" means toward the center of the tire and "outer" means toward its exterior;

"Leading" refers to a portion or part of the tread that contacts the ground first, with respect to a series of such parts or portions, during rotation of the tire in the preferred direction;

"Net-to-gross ratio" means the ratio of the tire tread rubber that makes contact with the road surface while in the footprint, divided by the area of the tread in the footprint, including non-contacting portions such as grooves;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Radial" and "radially" means directions radially toward or away from the axis of rotation of the tire;

"Radial-ply tire" means a belted or circumferentially-restricted pneumatic tire in which the ply cords which extend from bead to bead are laid at cord angles between 650 and 900 with respect to the equatorial plane of the tire;

"Section height" (SH) means the radial distance from the nominal rim diameter to the outer diameter of the tire at its equatorial plane; and "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

SUMMARY OF THE INVENTION

A pneumatic agricultural tire having a rim diameter of 24 inches (61 cm) or greater is described. The tire comprises a casing having a cord reinforced rubber-coated carcass and a rubber tread disposed radially outwardly of the carcass. The tread includes an inner tread and tread lugs. The lugs are of a depth less than an R1 depth and the tread has a net-to-gross ratio of less than 30%.

The tread is characterized by at least thirty-six lugs which extend radially outwardly from the inner tread. The lugs are divided into two sets. The first set of lugs is spaced circumferentially about the 60% of the section width from an axially outer end to an axially inner end and less than a majority of the lugs extend across the equatorial plane of the tire. Each lug has a leading and a trailing edge extending from the axially outer end to the axially inner end. The second set of lugs are similar to, but opposite in hand from the first set of lugs.

Each lug has a centerline located midway between the leading and trailing edge of the lug. The circumferential spacing $\chi_n$ between each centerline of circumferentially adjacent lugs is measured at a circumferential plane parallel to and located 75% of the distance SW/2 from the equatorial plane to a plane tangent to the casing at the maximum section width. The spacing $\chi_n$ varies by at least 10% of the section width from each circumferentially adjacent lug spacing.

This embodiment can employ two, three or four distinct spacings which are repeated about the circumference of the tire.

BRIEF DESCRIPTION OF THE DRAWINGS

FIGS. 13–18 illustrate views taken from the footprints of tires:

In the drawings, the same numerals are used to designate the components or items in the several views.

DETAILED DESCRIPTION OF THE INVENTION

With particular reference now to FIGS. 1–4, FIGS. 9 and 11, a preferred embodiment of the pneumatic agricultural tire 10 made according to the present invention is illustrated.

Figure 9:
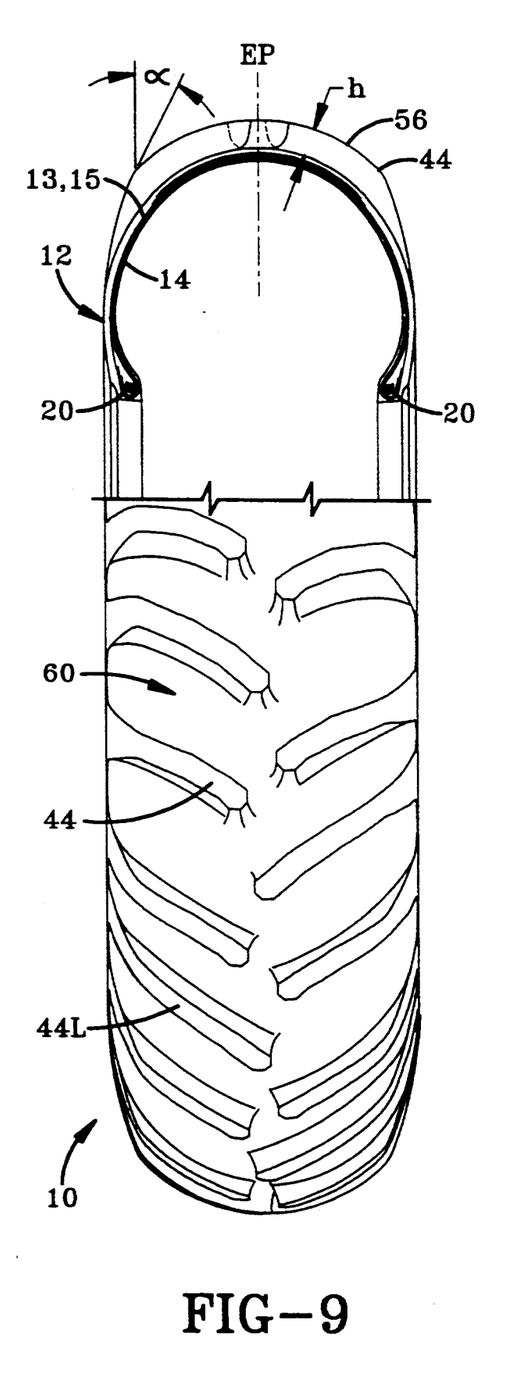
FIG. 9 illustrates a plan view with a portion of the tire of FIG. 1 removed thus exposing the cross section of the tire.
Figure 10:
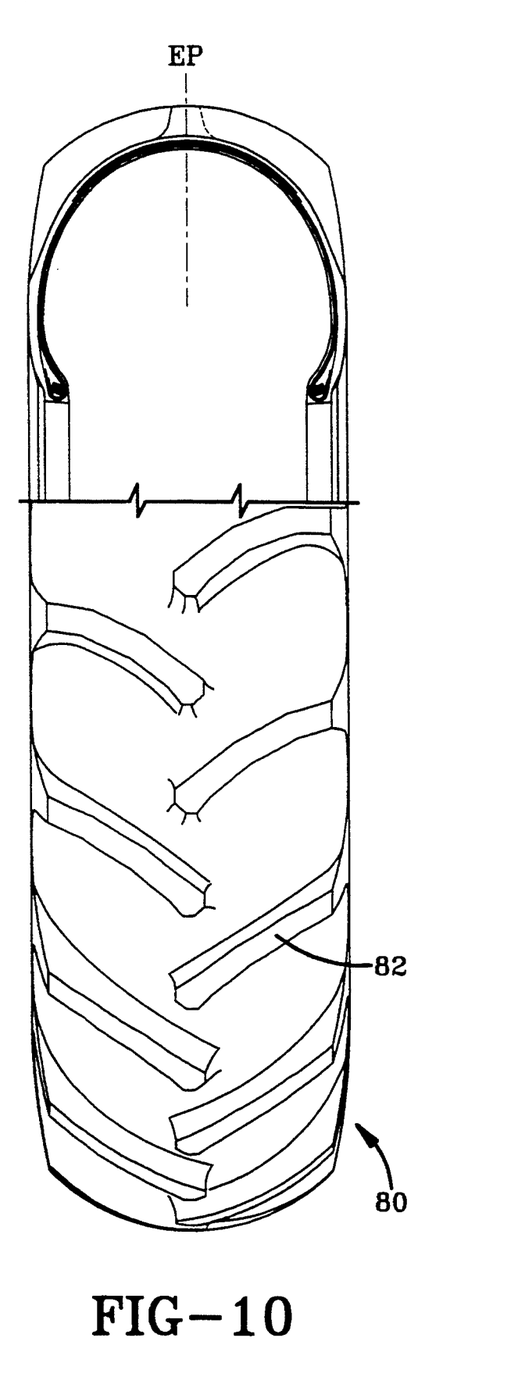
FIG. 10 illustrates a view similar to FIG. 9 but depicting the prior art tire.
Figure 11:
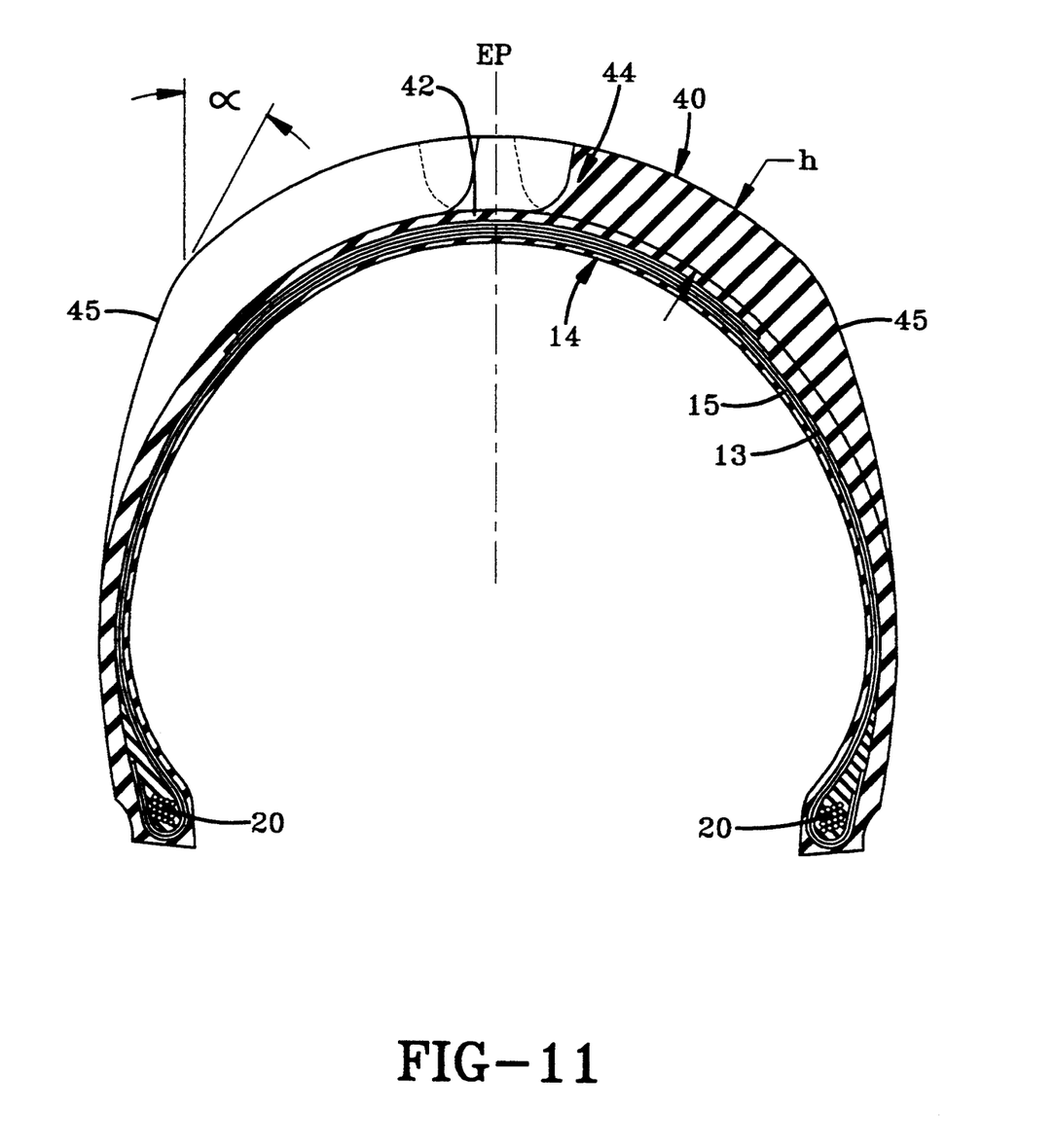
FIG. 11 is a cross sectional view of the tire of FIG. 1.

The illustrated tire 10 has a nominal rim diameter (D) of 24.0 inches (61 cm). Alternatively, the diameter can be of any size suitable for agricultural use such as 38 inches (97 cm). The tire has an axis of rotation R, an equatorial centerplane (EP) and a maximum section width (SW). The tire 10 has a casing 12. The casing 12 includes a cord reinforced rubber-coated carcass 14 and a pair of beads 20,20'. The carcass 14 as illustrated in FIGS. 9 and 11 has two bias plies 13,15 extending from bead 20 to bead 20'. The tire 10 has a tread 40 disposed radially outwardly of the casing 12.

The tread 40 includes an inner tread 42 and tread lugs 44,44L of a depth of about 80% of the R1 depth. The depth R1 is defined as an industry standard as described by the Tire and Rim Association, Inc., as a regular or conventional depth. The R1 depth is 1.52 inches or 3.9 cm deep.

Figure 1:
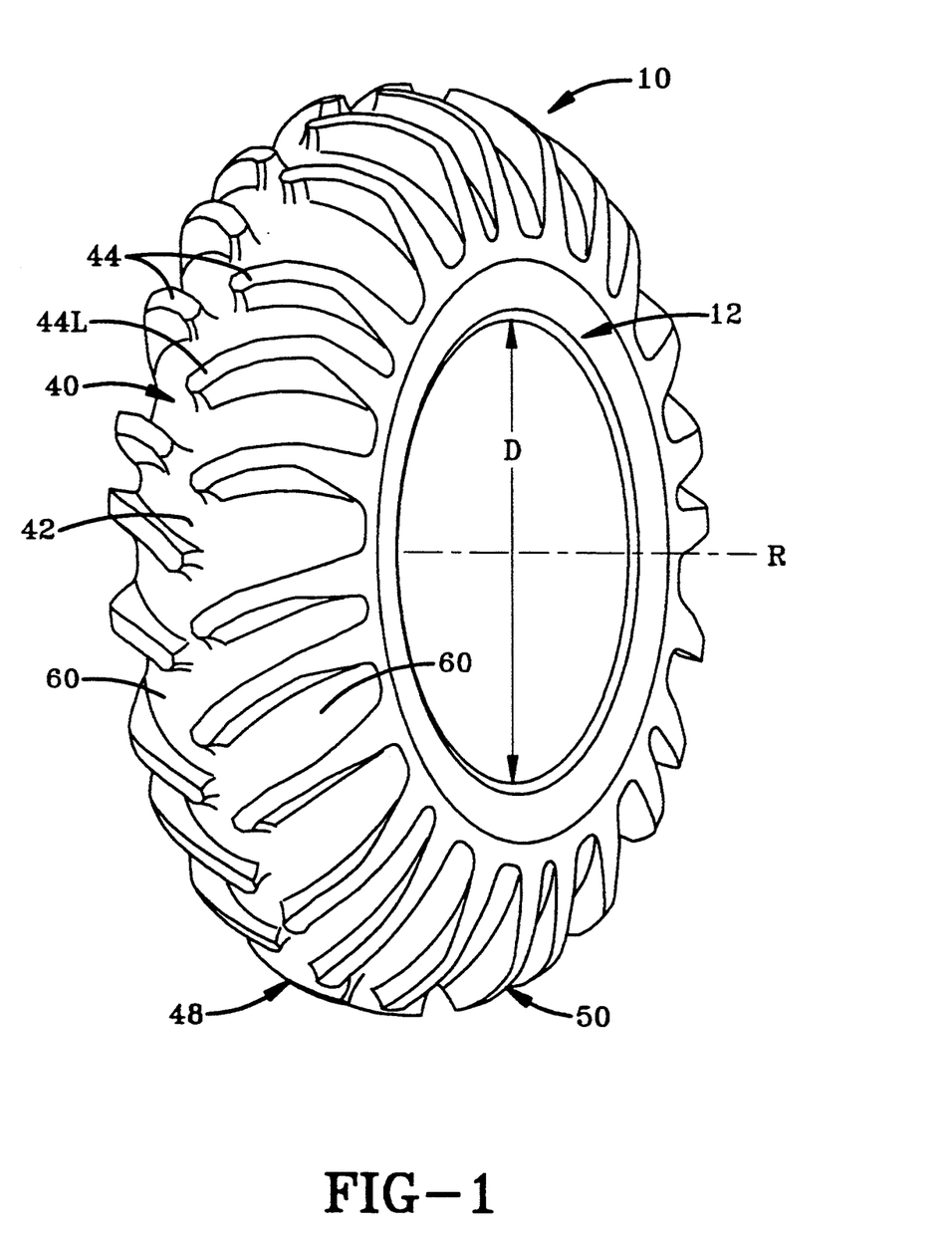
FIG. 1 illustrates a perspective view of a preferred embodiment agricultural tire made in accordance with the present invention.
Figure 2:
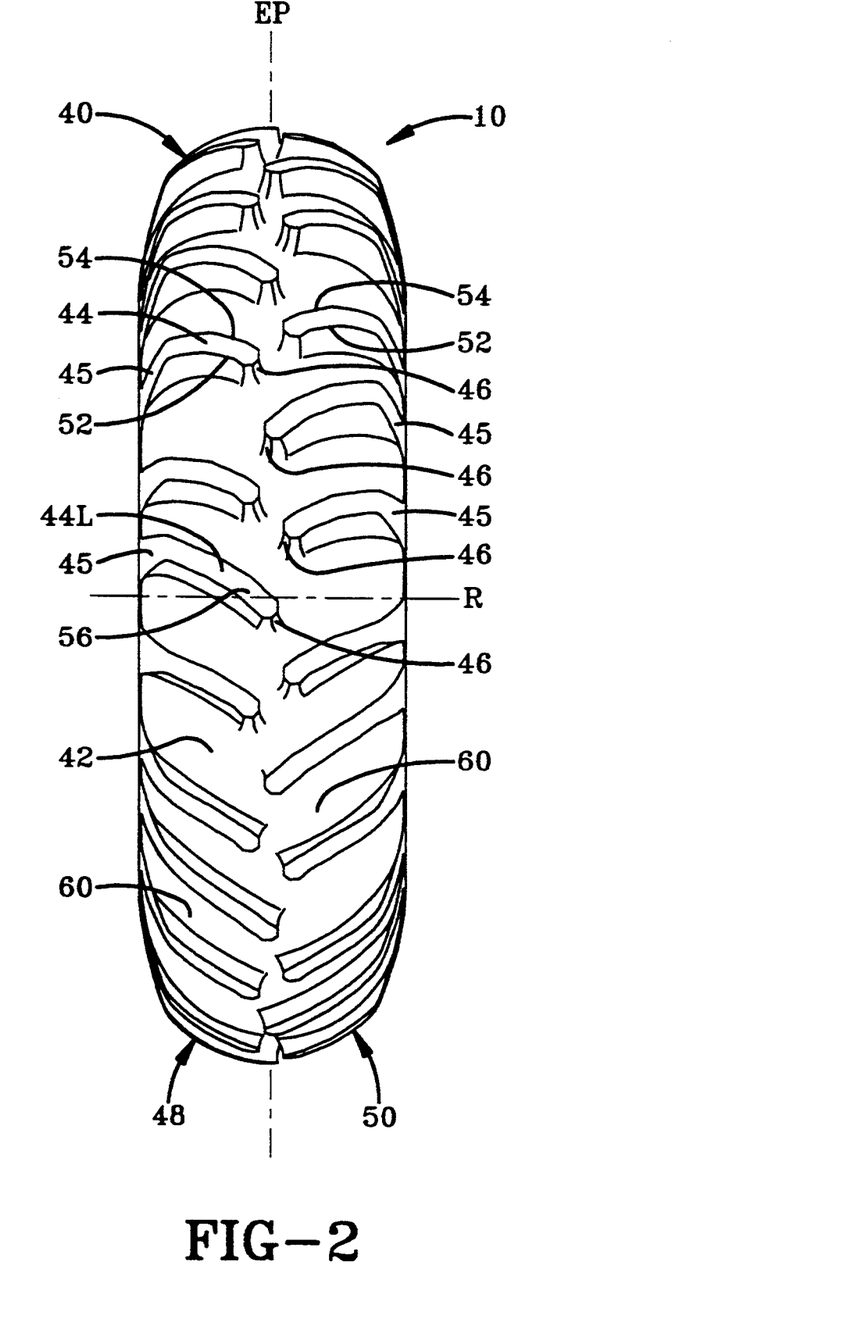
FIG. 2 is a plan view of the tire shown in FIG. 1.
Figure 3:
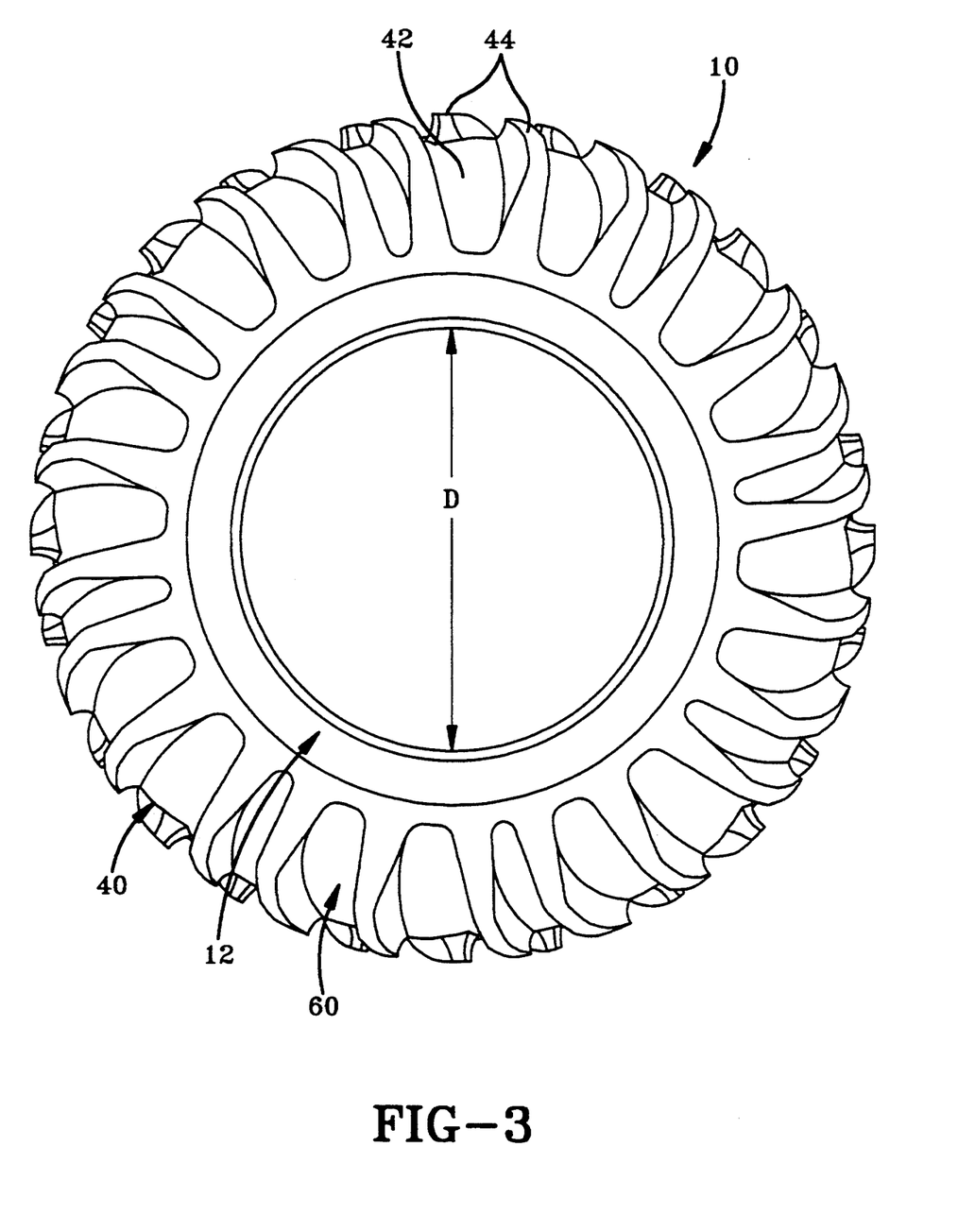
FIG. 3 is a side view of the tire shown in FIG. 1.

The preferred embodiment tire 10 as illustrated in FIG. 3 has 48 lugs 44, 32 of the lugs 44, extending between 25% and 45% of the tire's maximum section width (SW) from an axially outer end 45 to an axially inner end 46, and 16 lugs 44L extending between greater than 45% to 60% of the tire's maximum section width (SW) between an axially outer end 45 and an axially inner end 46.

The lugs 44,44L are divided into a first set 48 and a second set 50, each set extending from an opposite side of the tire 10. The first set of lugs 8 are circumferentially spaced about the tread 40. Each lug 44,44L has a leading edge 52 and a trailing edge 54. The second set 50 of lugs 44,44L are similar to but opposite in hand from the first set 48.

Figure 4:
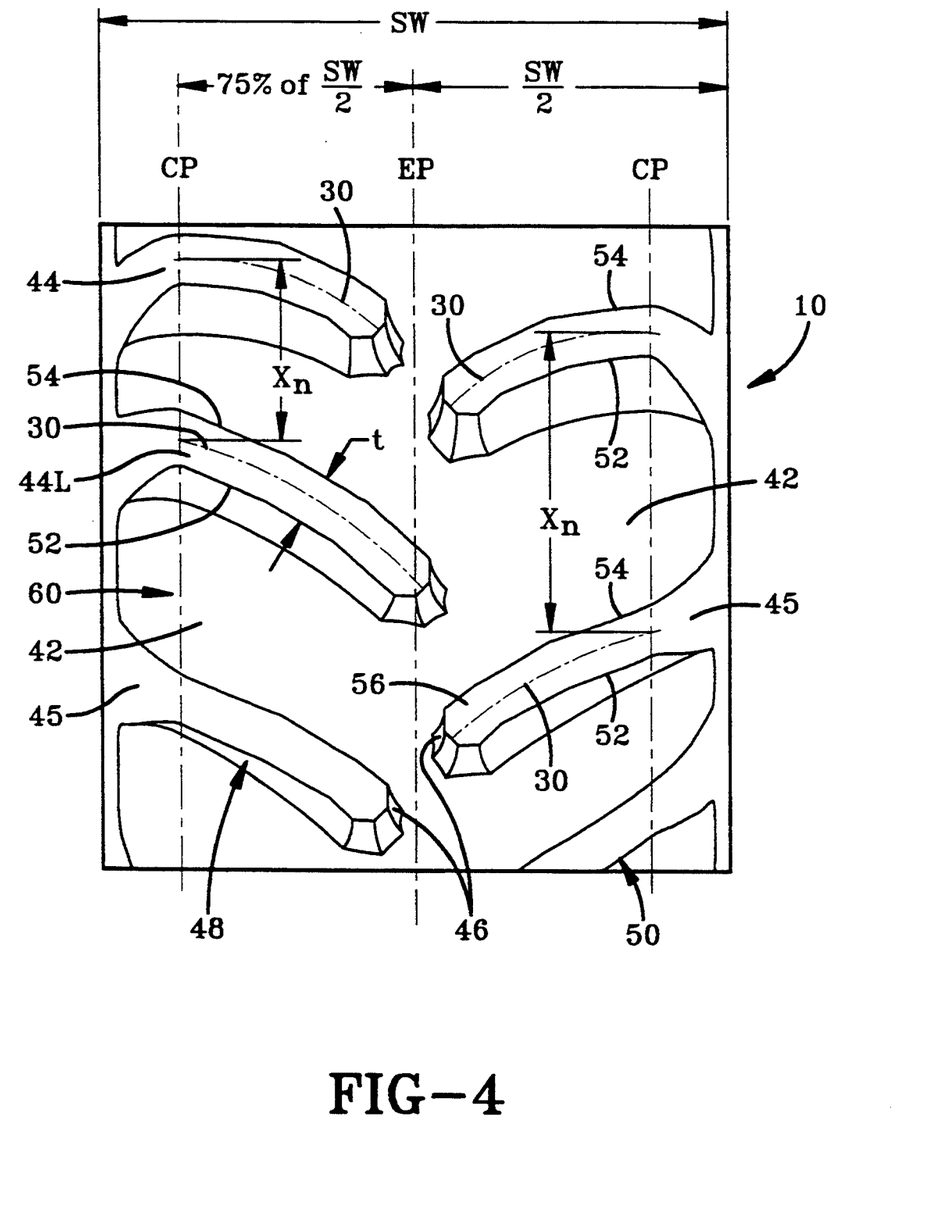
FIG. 4 is an enlarged fragmentary view of a portion of the tread illustrated in FIG. 1.
Figure 5:
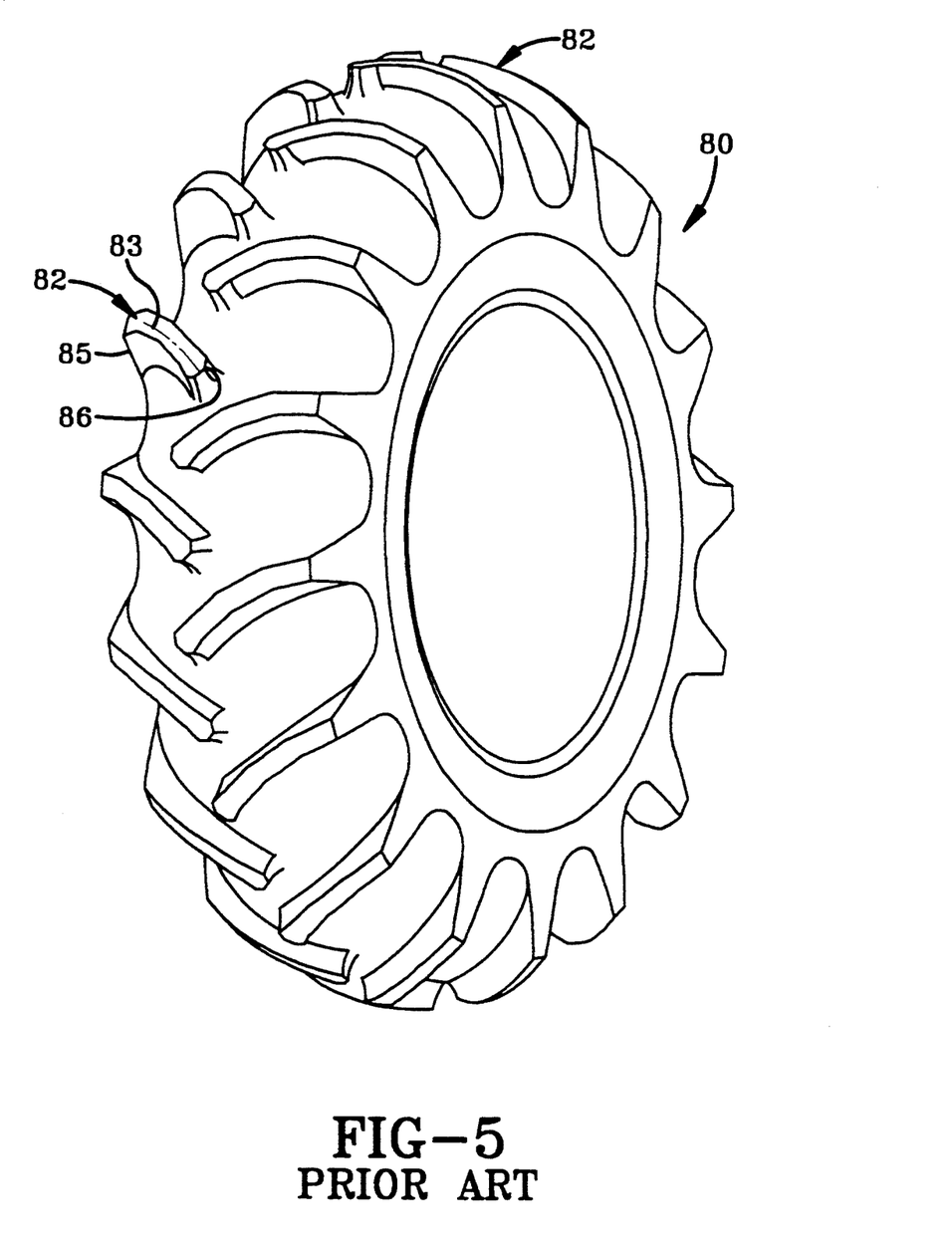
FIG. 5 illustrates a perspective view of a prior art tire.
Figure 6:
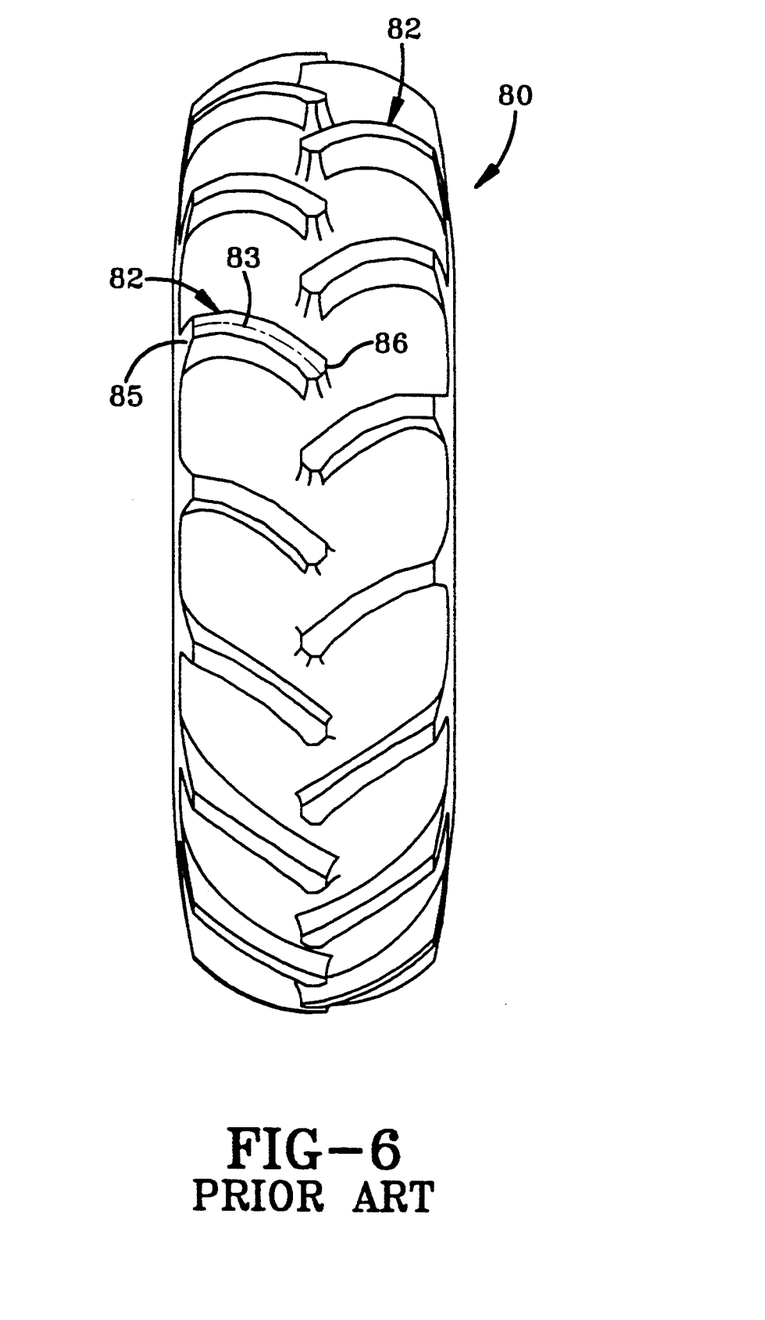
FIG. 6 is a plan view of the prior art tire shown in FIG. 5.
Figure 7:
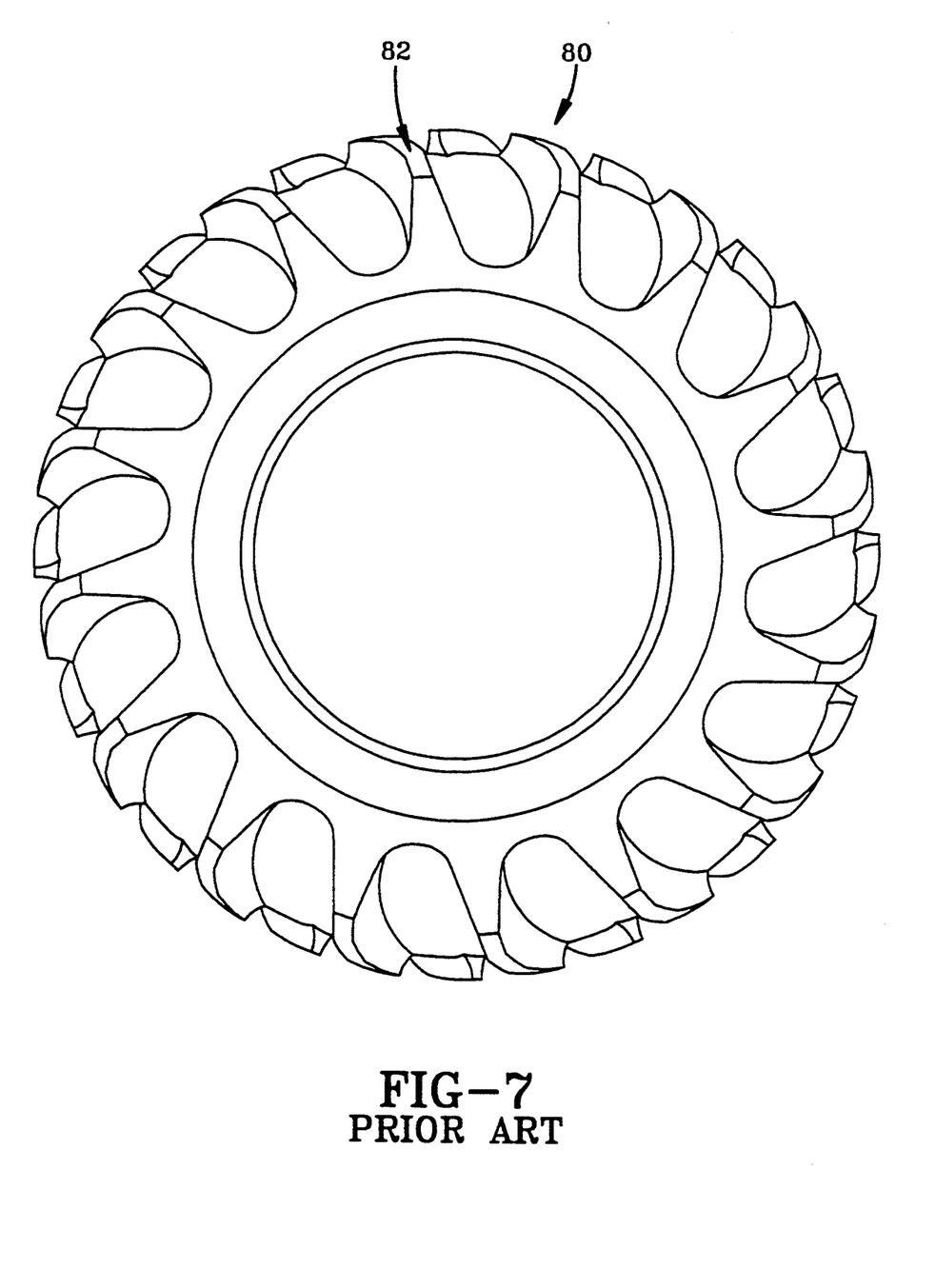
FIG. 7 is a side view of the prior art tire illustrated in FIG. 5.
Figure 12:
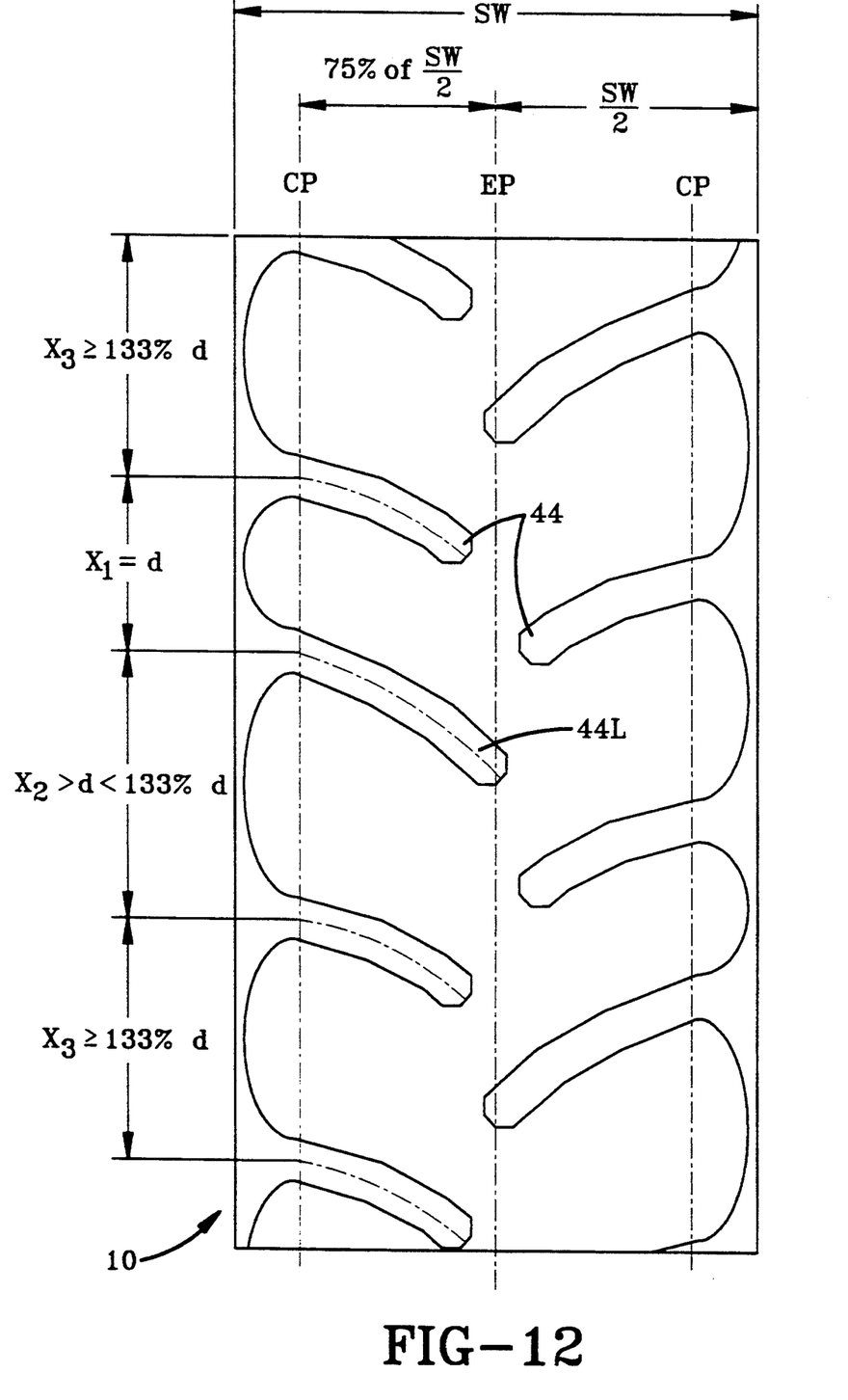
FIG. 12 is an enlarged fragmentary view of the tire of FIG. 1.
Figure 13:
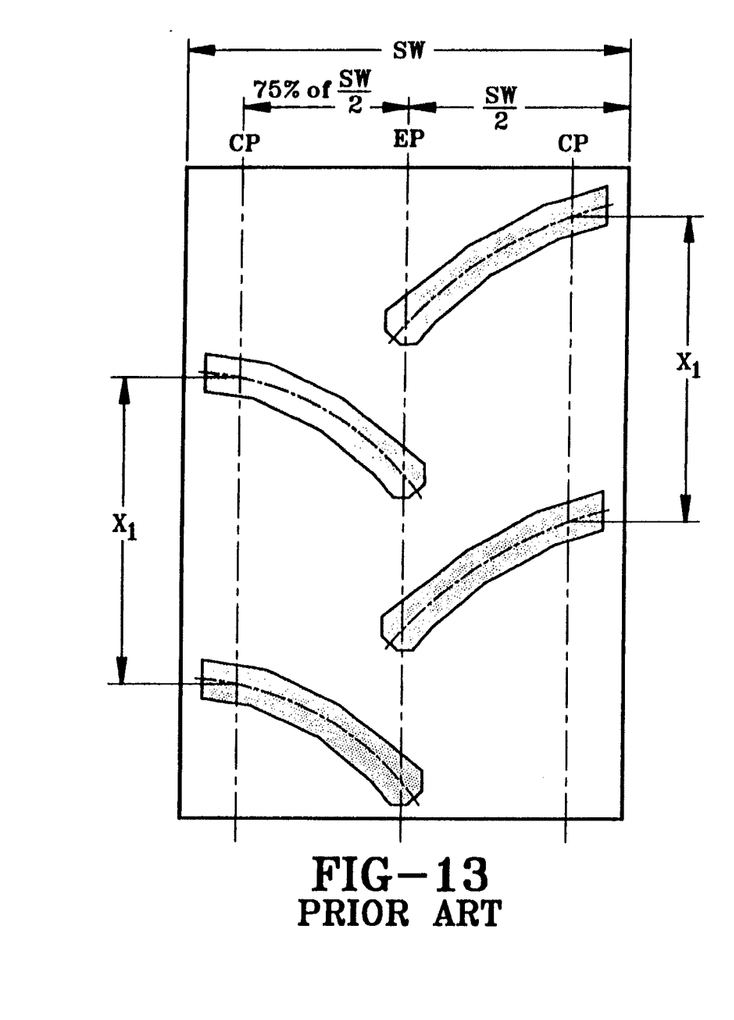
FIG. 13 shows the footprint of the prior art tire of FIG. 1.
Figure 14:
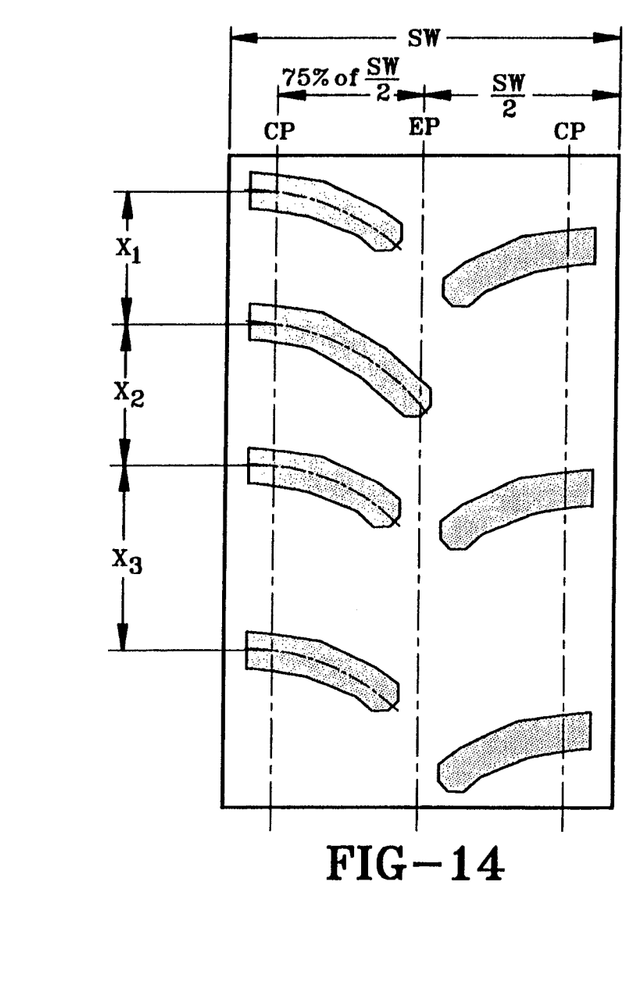
FIG. 14 shows the footprint of the tire illustrated in FIG. 1, having three distinct spacings $\chi_1$, $\chi_2$, $\chi_3$.

As illustrated in FIGS. 4 and 12, each lug 44,44L has a centerline 30 located midway between the leading edge 52 and the trailing edge 54 of the lug 44,44L. The circumferential spacing $\chi_n$ between each centerline 30 of circumferentially adjacent lugs 44,44L is measured at a circumferential plane (CP) parallel to and located 75% of the distance SW/2 from the equatorial plane (EP) to a plane tangent to the casing at the maximum section width. The distance $\chi_n$ varies by at least 10% of the section width (SW) from each circumferentially adjacent lug spacing.

Figure 15:
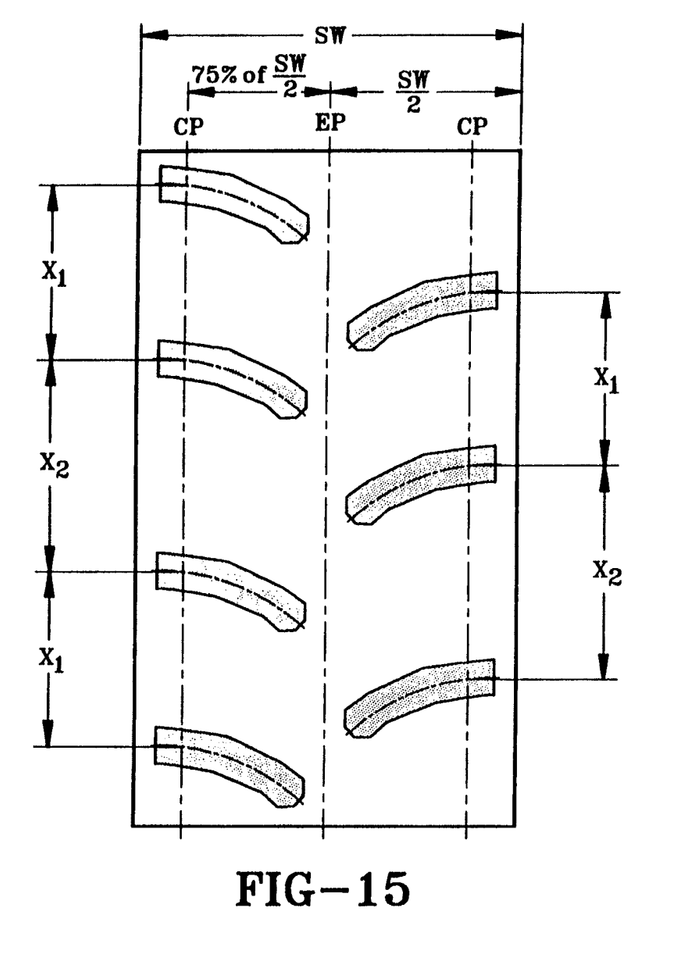
FIG. 15 depicts a footprint of a tire wherein all lugs do not cross the equatorial plane and has two distinct spacings $\chi_1$ and $\chi_2$.
Figure 16:
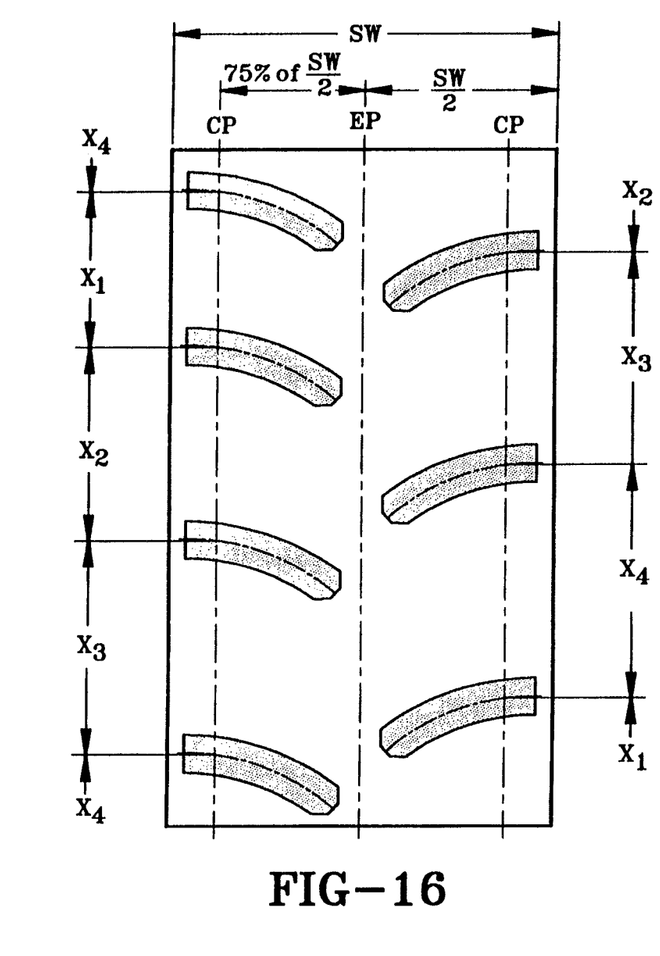
FIG. 16 depicts a footprint of a tire wherein all the lugs are curved and spaced from the equatorial plane and have four distinct spacings $\chi_1$, $\chi_2$, $\chi_3$, $\chi_4$.
Figure 17:
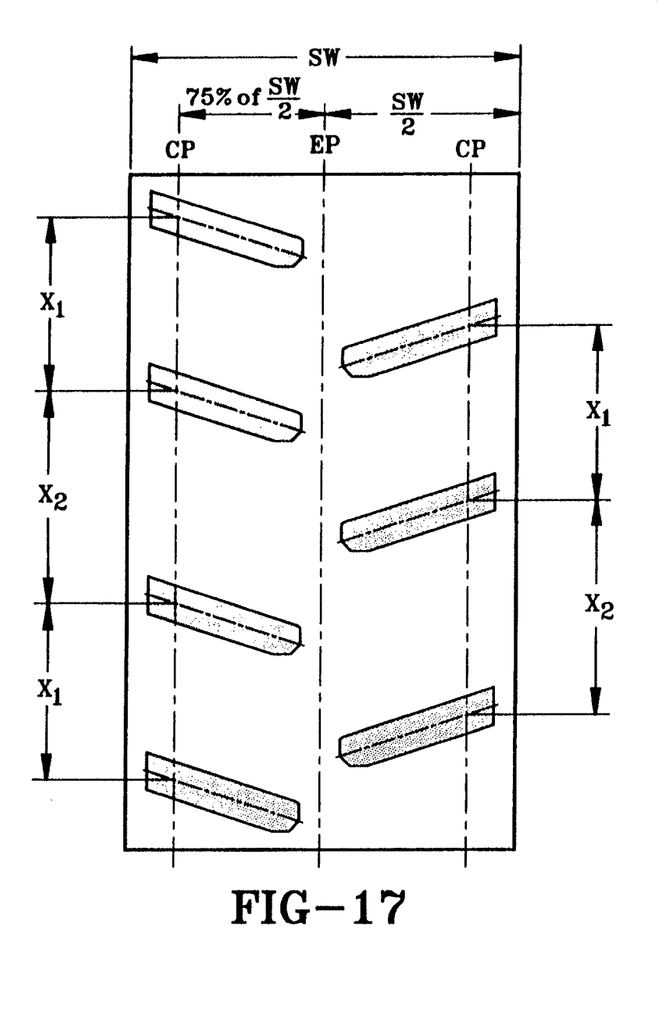
FIG. 17 depicts a footprint wherein the lugs are straight and spaced from the equatorial plane and have two distinct spacings.
Figure 18:
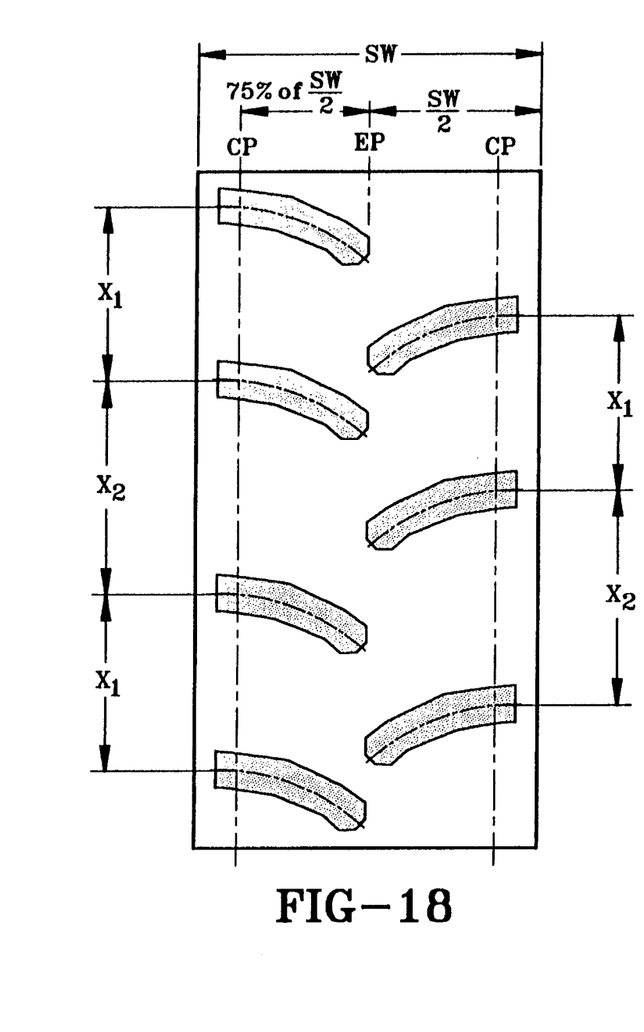
FIG. 18 depicts a footprint wherein all the lugs cross the equatorial plane and have two distinct spacings.

As illustrated in FIGS. 14–18, a tire according to the present invention can be designed with a variety of lug spacings. The preferred embodiment employs three spacings, $\chi_1$, $\chi_2$, and $\chi_3$. Alternatively tires employing two spacings, $\chi_1$ and $\chi_2$, can be employed as shown in FIGS. 15, 17 and 18. Also, as shown in FIG. 16, a pattern of four distinct spacings, $\chi_1$, $\chi_2$, $\chi_3$, and $\chi_4$ can be used. One advantage of employing variable or distinct spacings is that the tread design pattern can employ more lugs while maintaining a sufficient spacing of the lugs at the center of the tread to insure that the tire does not pack with mud.

It is believed that when employing two distinct circumferential spacings of lugs consisting of $\chi_1$ and $\chi_2$ distances, the number of lugs should be equal in both the first and second sets.

When employing three distinct spacings $\chi_1$, $\chi_2$ and $\chi_3$, it is believed that the number of lugs within each set should be equal and selected from the group of 18, 21 or 24 lugs per set.

When employing four distinct spacings, $\chi_1, \chi_2, \chi_3,$ and $\chi_4$, it is believed preferable to have equal numbers of lugs in each set and that the number of lugs be selected from the group of 20, 24 or 28 lugs per set.

Figure 8:
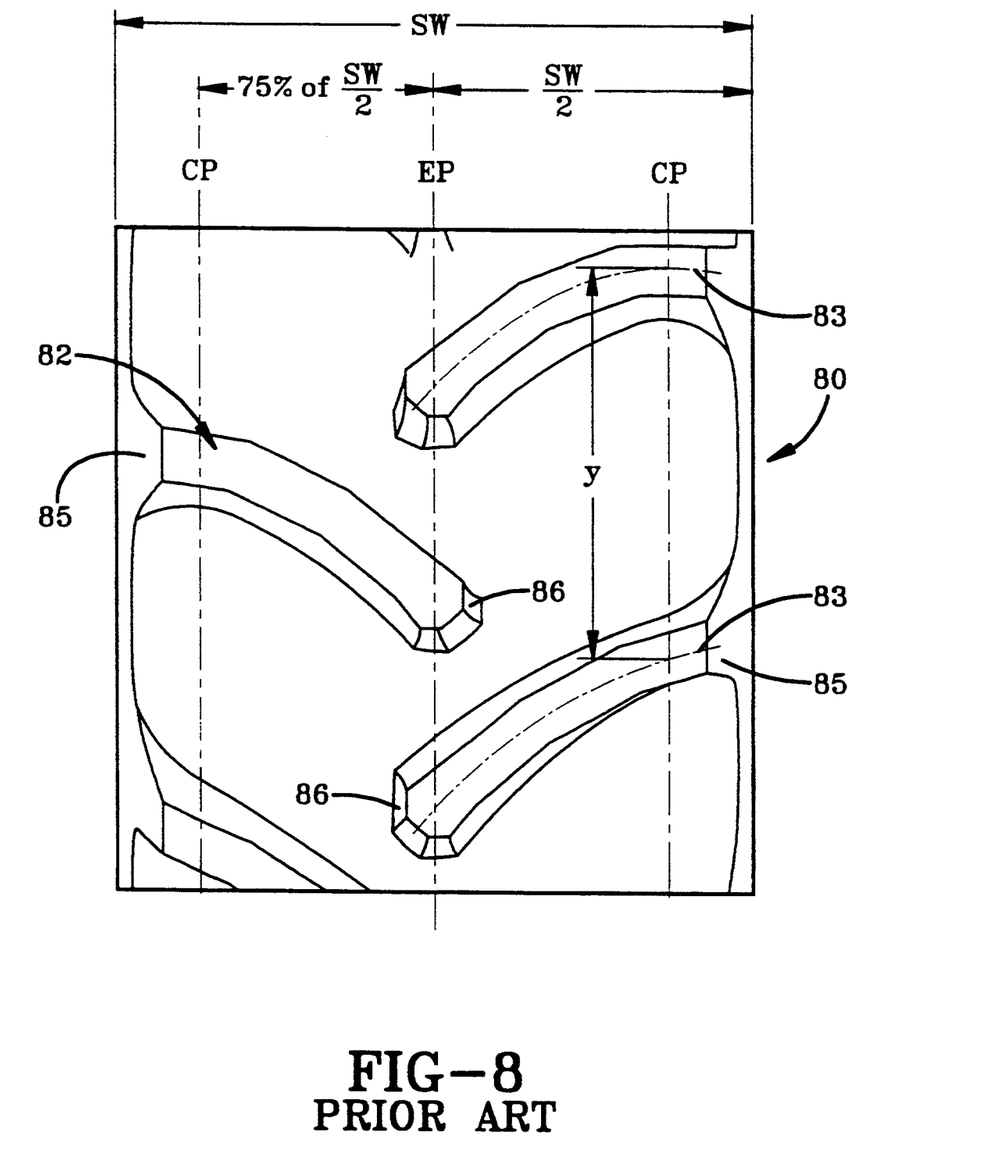
FIG. 8 is an enlarged fragmentary view of a portion of the tread of the prior art tire shown in FIG. 5.

As illustrated in FIGS. 15–18, the lugs may be of various shapes such as, but not limited to, straight, curved or multi-angled polygons. Furthermore, they can all extend inwardly not crossing the equatorial plane as in FIGS. 15, 16 and 17, or can all cross the equatorial plane as in FIG. 18. The conventional practice in the farm tire art was to employ evenly or uniformly spaced tread lugs. That is to say the tread lugs had a single spacing circumferentially. FIGS. 5–8 and FIG. 10 depict a prior art tire 80. As shown in FIG. 8, the tire 80 has a plurality of tread lugs 82 generally evenly and uniformly spaced a distance y between tread lug centerlines 83. The lugs 82 extended from an axially outer end 85 to an axially inner end 86. The lugs 82 all cross the equatorial plane EP. The generally accepted practice to achieve cost efficiency led the tire engineers to develop tires having fewer and fewer lugs. The illustrated tire 80, for example, depicts a Goodyear Traction Irrigation II tire which employs 32 lugs 82. The tire has a gross weight of 110 pounds (50 Kg) in the 14.9-24 tire size. The tire 10 of the present invention having a similar size designation 14.9-24 employs 48 lugs 44,44L, 32 short and 16 long. The tire as designed has an overall weight of 91 pounds (41 Kg) or 19 pounds (8.6 Kg) less than the prior art tire 80. The tread with 48 lugs 44,44L is 17 pounds (7.7 Kg) lighter than the prior art tread having 32 lugs 82. It is believed that the employment of long and short lugs which are variably spaced as illustrated permits the use of significantly less tread rubber in spite of the fact that there are more lugs.

Although there have been other tires designed which employ 48 lugs in a tire of similar size, those tires have weights of 106 pounds (48 Kg). This is believed to be partly the result of employing only long lugs that all cross the centerline and which are uniformly spaced.

A second factor which contributes to the reduced weight of the tire according to the present invention is that the axially outer end 45 of each lug 44,44L is inclined at an angle $\alpha$ of at least 20° relative to a plane parallel to the equatorial plane EP as measured tangent to the axially outer end 45 near the intersection of the axially outer end 45 and the radially outer surface 56. The inclined axially outer end 45 intersects a radially outer surface 56 of the tread lug 44,44L as illustrated in FIGS. 9 and 11.

A third factor that contributes to the light weight tread 40 is that the lug's radially outer surface 56 extends a radial distance (h) from the axially inner end 46 of the lug 44,44L to where the axially outer end 45 intersects the radially outer surface 56 of the lug 44,44L. This substantially constant lug height (h) is equal to about 80% of the R1 lug depth as previously discussed.

It is believed that tread weight reductions can be achieved by employing at least 36 such lugs 44,44L, preferably at least 40 and most preferably 48.

It is believed important that the axially inner ends 46 of each lug 44,44L be spaced a minimum distance of at least 5% of the maximum section width 46 of the tire 10 to preclude mud packing of the tread 40.

In the preferred embodiment as illustrated in FIGS. 4 and 9, the thickness t or width of each lug as measured at the radially outer surface 56 of the lug 44,44L perpendicular to the centerline 30 of the lug 44,44L is a constant over 90% of the length of the lug 44,44L between the axially inner end 46 and the intersection of the axially outer end 45 and the radially outer surface 56. The thickness (t) is preferably less than the radial height (h) of the lug 44,44L. Enlarged lug heads commonly employed in rear tractor tires are avoided. In the illustrated preferred embodiment, the axially inner portion of the lug is preferably not any thicker than the thickness t of the lug 44,44L.

The preferred embodiment tire 10 as illustrated in FIGS. 1–4 and FIG. 9 and FIG. 11 has a first set 48 of lugs 44 that extend generally axially inwardly a distance of 25% to 45% of the section width SW from the axially outer end 45 to the axially inner end 46, the axially inner end 46 terminating prior to crossing the equatorial plane EP. The second set 50 of lugs 44 are similar, but opposite in hand, from the first set 48. The first and second sets 48,50 further include long lugs, designated 44L, the long lugs 44L being in two sets. The first set of long lugs 44L extend generally axially inwardly a distance of greater than 45% to 60% of the section width SW from the axially outer end 45. As illustrated, one long lug 44L of the first set is circumferentially spaced between two pairs of lugs 44 of the first set 48. The second set of long lugs 44L are similar to, but opposite in hand, from the first set of long lugs 44L. One long lug 44L of the second set 50 is circumferentially spaced between two pairs of lugs 44 of the second set 50. Each long lug of the second and first sets has an axially inner end 46, the axially inner ends 46 of each long lug 44L is circumferentially spaced between the axially inner ends 46 of two adjacent lugs 44 of the opposite set.

A plurality of soil discharge channels 60 are spaced axially above the inner tread surface 42 and between circumferentially adjacent lugs 44 extending from the same side or direction of the tire 10. Each soil discharge channel 60 has a circumferential width at the axially outer ends 45 of the lugs 44 which is different from the circumferentially adjacent soil discharge channel by at least 10% of the circumferential width of the channel 60 as measured at the axially outer end 45 of the lugs 44.

As illustrated in FIG. 12, the preferred embodiment has the centerline 30 at the axially outer end 45 of a first lug 44 of the first set 48 circumferentially spaced a distance (d) from the centerlines 30 at the axially outer end of an adjacent long lug 44L of a first set 48 and a distance of at least 133% (d) from the centerline 30 at the axially outer end 45 of an adjacent second lug 44 of the first set. The centerline at the axially outer end of the long lug 44L is spaced a distance greater than (d) but less than 133% d from the centerline 30 at the axially outer end 45 of a third adjacent lug 44 of the first set 48. This sequence of spacing between lugs 44 is repeated about the circumference of the tread 40 thus forming a 3-pitch sequence. The second set 50 of lugs 44 and long lugs 44L are similarly oriented but opposite in hand.

In the illustrated preferred embodiment of FIGS. 1–4, a tire having a nominal rim diameter of 24.0 inches (61 cm) is shown employing three distinct spacings of lugs 44. The preferred embodiment tire 10 illustrated in FIG. 12, the lugs are spaced as follows: the centerline at the axially outer end 45 of a first lug is spaced a distance (d) of 5.315 inches (13.5 cm) from the centerline of an adjacent long lug 44L, the first lug 44 is also spaced a distance of 144% (d) 7.670 (19.5 era) inches from an adjacent second lug 44 between centerlines. The centerline of the long lug 44L at the axially outer end is spaced a distance of 122% (d), 6.493 inches (16.5 cm) from an adjacent third lug 44.

What is claimed is:

1. A pneumatic agricultural tire having a maximum section width, an equatorial plane and a nominal rim diameter of 24.0 inches (61 cm.) or greater, the tire comprising a casing having a carcass reinforced with rubber-coated cord and a rubber tread disposed radially outwardly of the carcass, the tread including an inner tread and tread lugs of a depth less than a standard R1 depth and the tread having a net-to-gross ratio of less than 30%, the tread being characterized by;

at least 36 lugs extending radially outwardly from the inner tread, the lugs being in two sets, the first set of lugs being spaced circumferentially about the tread and extending generally axially inwardly a distance of 25% to 60% of the section width from an axially outer end to an axially inner end, less than a majority of the lugs extending across the equatorial plane of the tire, each lug having a leading and a trailing edge extending from the axially outer end to the axially inner end, the second set of lugs being similar to, but opposite in hand from the first set of lugs; and wherein each lug has a centerline located midway between the leading and the trailing edge of the lug, the circumferential spacing $\chi_n$ between each centerline of circumferentially adjacent lugs being measured at a circumferential plane parallel to and located 75% of the distance SW/2 from the equatorial plane to a plane tangent to the casing at the maximum section width, the distance $\chi_n$ differing by at least 10% of the section width from the spacing distance $\chi_n$ of each circumferentially adjacent lug spacing.

2. The tire of claim 1 wherein there are two distinct circumferential spacings of lugs consisting $\chi_1$, $\chi_2$ distances and wherein the number of lugs of the first set equals the number of lugs of the second set.

3. The tire of claim 1 wherein there are three distinct circumferential spacings of lugs consisting of $\chi_1$, $\chi_2$ and $\chi_3$ distances and wherein the number of lugs within each set is equal and selected from the group of 18, 21 or 24 lugs per set.

4. The tire of claim 1 wherein there are four distinct circumferential spacings of lugs consisting of $\chi_1$, $\chi_2$, $\chi_3$ and $\chi_4$ and wherein the number of lugs within each set are equal and selected from the group of 20, 24 or 28 lugs per set.

5. The pneumatic agricultural tire of claim 1 wherein the tire is comprised of a pair of beads and the cord reinforced rubber coated carcass has two bias plies, the plies extending from bead to bead.

6. The pneumatic agricultural tire of claim 2 wherein the first set has lugs extending generally axially inwardly a distance of 25% to 45% of the section width from the axially inner end, and the axially inner end terminating prior to crossing the equatorial plane, the second set has lugs being similar to, but opposite in hand from, the first set of lugs.

7. The pneumatic agricultural tire of claim 6 wherein each of the first and second sets of lugs further includes long lugs, the long lugs extending generally axially inwardly a distance of greater than 45% to 60% of the section width from an axially outer end, one long lug of the first set being circumferentially spaced between two pairs of shorter lugs of the first set, the second set of long lugs being similar to, but opposite in hand from, the first set of long lugs, one long lug of the second set being circumferentially spaced between two pairs of shorter lugs of the second set, each long lug of the second and first set having an axially inner end, the axially inner ends of each long lug being circumferentially spaced between the axially inner ends of two adjacent shorter lugs of the opposite set.

8. The tire of claim 7 further comprises;

a plurality of soil discharge channels, the channels being the space above the inner tread surface and between circumferentially adjacent lugs extending from the same direction, each soil discharge channel having a circumferential width at the axially outer ends of the lugs which is different from the circumferential width of each circumferentially adjacent soil discharge channel by at least 10% of the circumferential width of the channel as measured at the axially outer end of the lugs.

9. The pneumatic agricultural tire of claim 1 wherein each lug has a radially outer surface and an axially outer end, the axially outer end extending radially outwardly and axially inwardly from the inner tread surface to the radially outer surface of the short lug, the axially outer end being inclined at least 25° relative to a plane parallel to the equatorial plane.

10. The pneumatic tire of claim 9 wherein the radially outer surface of the lugs extend from the inner tread surface a radial distance (h) from the axially inner end of the lug to where the axially outer end of the lug intersects the radially outer surface.

11. A pneumatic tire of claim 1 having at least 40 lugs.

12. A pneumatic tire of claim 7, the tire having 48 lugs consisting of 32 short lugs and 16 long lugs.

13. The tire of claim 1 wherein the axially inner ends of each lug at the radially outer surface are spaced a distance of a least 5% of the section width from an adjacent lug as measured in any direction.

14. The tire of claim 7, wherein the centerline at the axially outer end of a first lug of the first set is circumferentially spaced a distance (d) from the centerline at an axially outer end of an adjacent long lug of a first set, and a distance of at least 133% (d) from a centerline at an axially outer end of an adjacent second lug of the first set, the centerline at an axially outer end of the long lug being spaced a distance greater than (d) but less than 133% (d) from the centerline at an axially outer end of a third adjacent lug of the first set, the above sequence of spacing between lugs repeated about the circumference of the tread thus forming a 3-pitch sequence, the second sets of lugs and long lugs being similarly oriented but opposite in hand.

* * * * *